United States Patent [19]

Lewis

[11] 3,923,436

[45] Dec. 2, 1975

[54] APPARATUS FOR FORMING INTEGRAL HOMOGENEOUS BUILDINGS

[76] Inventor: David W. Lewis, The Shadows, Rte. 2, Box 198, Charlottesville, Va. 22901

[22] Filed: Mar. 7, 1974

[21] Appl. No.: 449,010

[52] U.S. Cl. ............ 425/64; 264/32; 264/33; 264/46.5; 425/114; 425/817 C; 264/275
[51] Int. Cl.² ................................... B29D 27/04
[58] Field of Search .......... 52/749, 206; 264/32, 47, 264/35, 33, 34, 271, 272, 273, 275, 277, 278, 279, 46.5; 425/4 R, 4 C, 114, 817 R, 817 C, 213, 115, 62, 63, 64, 65, 113, 121, 122, 126, 129, 466, 381; 249/39, 20, 21, 22

[56] References Cited
UNITED STATES PATENTS

| | | | |
|---|---|---|---|
| 1,965,844 | 7/1934 | Loomis | 425/114 |
| 3,222,749 | 12/1965 | Haas | 425/122 X |
| 3,234,620 | 2/1966 | Short | 425/62 |
| 3,443,276 | 5/1969 | Smith et al. | 425/4 C |
| 3,595,514 | 7/1971 | Sanders | 425/213 X |
| 3,659,977 | 5/1972 | Haws | 425/62 |
| 3,663,132 | 5/1972 | Andersson | 425/65 |
| 3,792,133 | 2/1974 | Goughnour | 425/64 X |

Primary Examiner—Robert D. Baldwin
Assistant Examiner—Mark Rosenbaum
Attorney, Agent, or Firm—Wm. J. Stephenson

[57] ABSTRACT

A machine for continuously forming buildings and similar structures from foamed plastic material. The machine moves over the area to be outlined by the building and forms a building as its movement progresses, thus resulting in a one piece homogeneous building structure. The machine also makes provisions for the simultaneous incorporation in said building of all the required adjuncts such as windows, doors, heating, and sprinkler systems, etc. The machine also includes provisions for simultaneously with the formation of the building applying surfacing material to form either the exterior or interior surface of the building or both.

8 Claims, 10 Drawing Figures

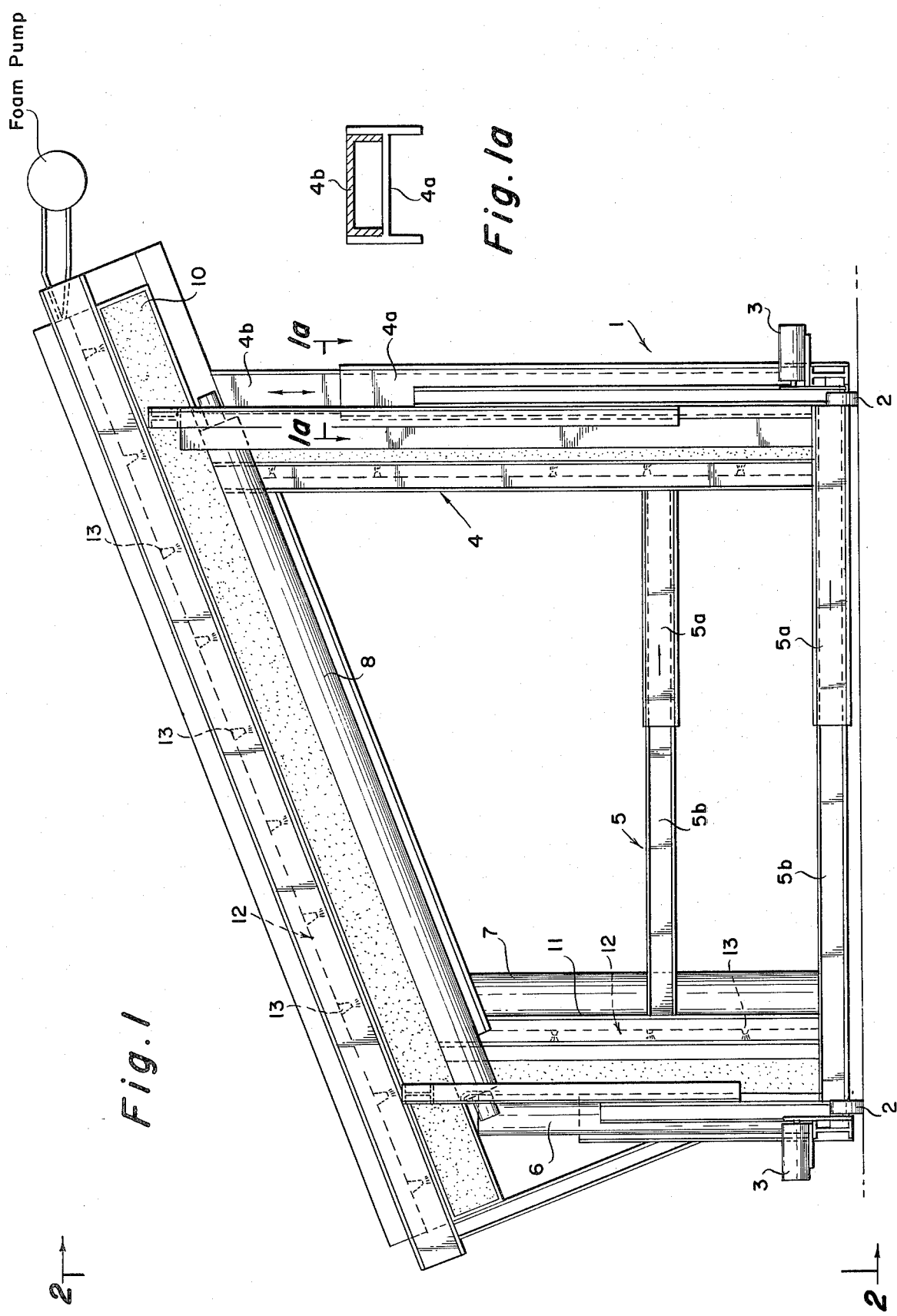

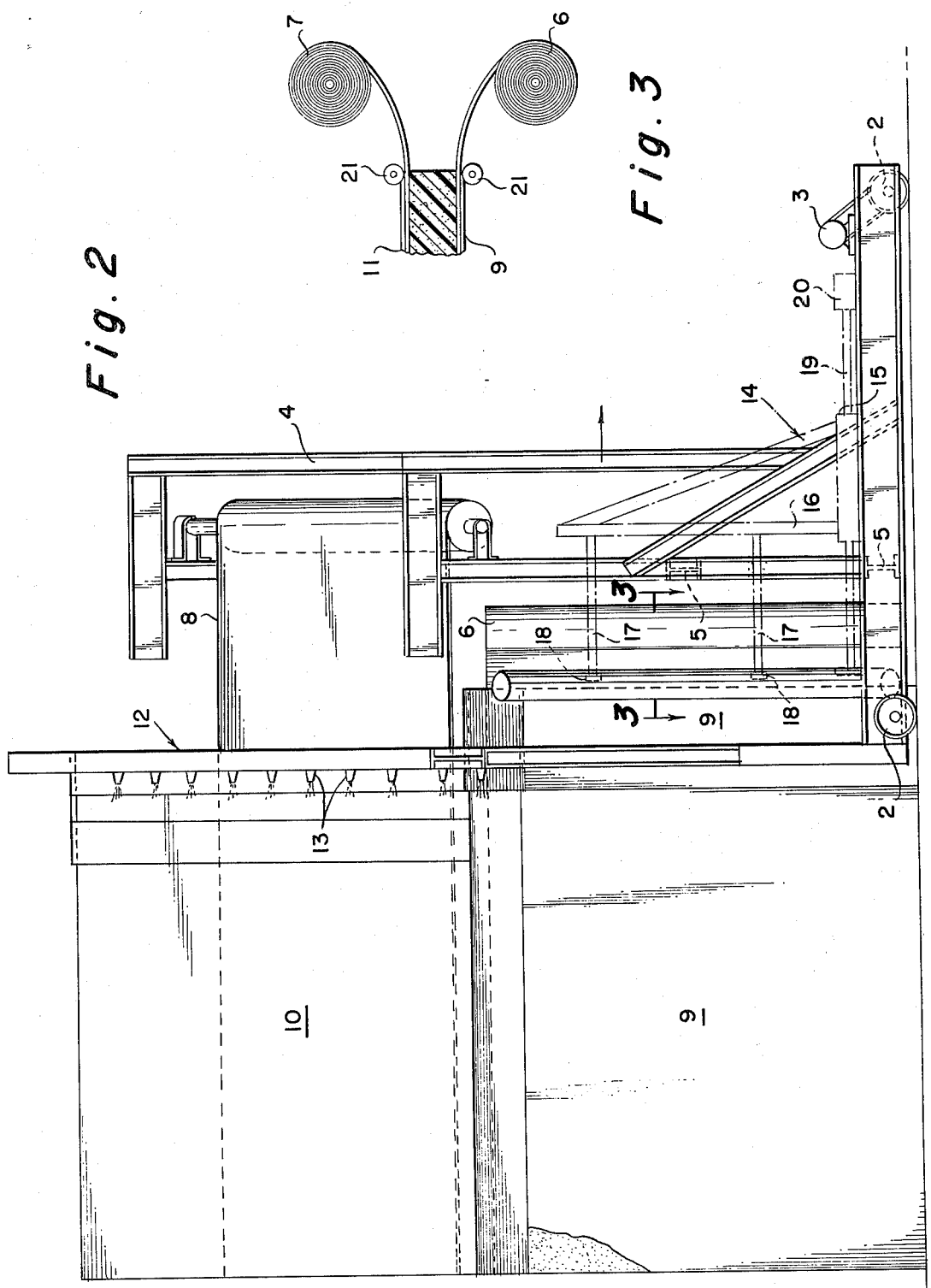

APPARATUS FOR FORMING INTEGRAL HOMOGENEOUS BUILDINGS

OBJECTS OF THE INVENTION

Buildings have previously been produced primarily from foamed plastic material by producing portions of said building at a central point and conveying said portions to a point of assembly. All of such buildings possess the disadvantage that said sections must be assembled, joined together and suitably incorporated into the final building structure with the resulting formation of joints and planes of weaknesses in the final building. Attempts have been made to produce buildings in situ, however, all continuous castings processes previously resorted to were limited to the production of domed shaped or circular types of buildings. Also, such prior practice only deposited a small portion of building at a time and thus resulted in a series of overlapping layers which resulted in joints or planes of weaknesses between the layers. Examples of such prior art are found in the Smith U.S. Pat. No. 3443276. The patent to Odell U.S. Pat. No. 3412426, Wright U.S. Pat. No. 3417429 and Lowes U.S. Pat. No. 3372431 further illustrate prior attempts to continuously produce buildings which were cast in place and all illustrate the limitations that previously used apparatus and procedures placed upon the size and shapes of buildings available and illustrate the impossibility of forming a homogeneous continuously produced building.

Other attempts at producing homogeneous casted in place buildings involve the use of elaborate form structures specifically designed to produce a specific size and shape of building and have found little if any acceptance in the art. An example of such practice is found in the Ming-yng Chang U.S. Pat. No. 3231644. Attempts to avoid expensive specially constructive forms also resulted in the use of inflatable interior air bags or cores as illustreted in the Turner U.S. Pat. No. 3277219 but the dome shaped type of building necessarily produced by such inflatable cores has found practically no architectural acceptance.

A major object of the invention is to design a machine to produce a one piece cast in place house which house may have all building adjuncts such as windows, doors, plumbing and electrical systems, etc. as an integral part thereof.

An object of this invention is to design a machine to produce a house from foamed polyurethane and the like as a single one piece unit.

It is an object of the present invention to design a machine capable of continuously producing buildings involving conventional architectural designs which exhibit none of the structural deficiencies of those produced by prior apparatus and methods.

It is an object of this invention to design a machine which may be adjusted to produce various shapes and sizes of buildings and which may incorporate additional features such as doors, windows, heating ducts, plumbing, sprinkler systems, etc. as desired.

It is also an object of this invention to design a machine to produce buildings having integral therewith finished surfaces either interior or exterior or both, which surfaces are produced simultaneously with the body of the building.

It is a further object of the invention to design a self-powered apparatus which may be continuously advanced over the area to be occupied by the building as the building is produced.

Another object of the invention is to design a machine that will produce a building with a minimum use of hand labor.

It is a further object of the invention to do away with expensive intricate form structures and to provide a building apparatus incorporating a minimum of forming or shaping members.

Other objects of my invention will become apparent as the description of the same unfolds.

BRIEF DESCRIPTION OF THE INVENTION

In brief, my machine consists of a framework designed to be mounted on wheels or rollers which may be self-powered and which is passed linearly over the area to be enclosed by the building. The framework may move on specially provided tracks or upon a precast slab previously poured to form the foundation or floor of the building or it may be provided with wheels which move over the terrain immediately adjacent to the exterior of the building and holds the framework suspended over the area where the building is to be cast.

On one end of the framework are mounted sets of forms which outline the exterior and interior of the building. However, it is obvious that in the case of the roof or other flat surfaces of the building, an exterior or top form may be omitted if desired. Adjacent to and in advance of the forms are mounted supply rollers designed to feed to the interior surfaces of the form, sheet material which may be incorporated in the building structure as the finished surfaces thereof. Immediately in advance of the form elements and between said supply rolls are mounted means for supplying the material which is to constitute the core or main body of the building. Such material supply means may be a series of suitably spaced material applying spray nozzles and a suitable material delivery system therefor.

The spray nozzles may be mounted on means for moving them back and forth to evenly supply the material to the area to be serviced by each individual nozzle. It is also possible to omit the spray nozzles and the supply system and to provide a platform on the frame immediately in advance of the forms where workmen may stand to manually spray or otherwise supply materials to the area between the forms. A walkway or other suitable support may be provided adjacent to the roof forms in this situation. The rolls for supplying interior surfacing material to the ceiling of the building are mounted directly beneath said walkway. The form sections which are mounted on the framework obviously determine the size and shape of the building produced.

IN THE DRAWINGS

FIG. 1 represents an end view of the machine.

FIG. 1a is a section taken on the line 1a—1a of FIG. 1 showing a telescopic means to adjust the pitch of the roof.

FIG. 2 is a side sectional view taken along the line of 2—2 of FIG. 1.

FIG. 3 is a sectional view taken on the line of 3—3 of FIG. 2 showing the side wall forms and the means for supplying the sheets of surfacing material.

Figure 7:
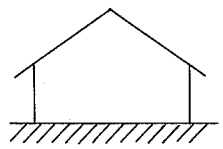
Figure 8:
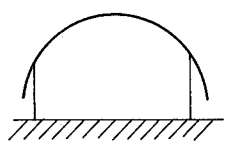
Figure 9:
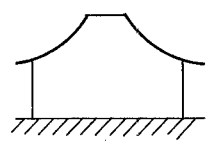

FIGS. 7, 8 and 9 diagramatically illustrate various roof sections which may be produced by the machine of the present invention.

A frame member is generally illustrated by the reference numeral 1 in both FIGS. 1 and 2. This frame is provided with wheels 2 driven by motors 3. Upon this frame member are mounted support members 4 and suitable bracing members 5 to brace the supports both vertically and horizontally. Upon these support members are mounted a supply of sheet material 6 for the surfacing of the exterior surfaces of the building, a similar supply 7 for surfacing the interior surfaces of the building and 8 for the ceiling or roof. The use of this sheet material is optional. The material may be varied as desired. For example, the interior sheet material may be merely burlap which may be used to constitute a base upon which surfacing materials such as nonfoamed plastic, paints, etc. may be applied or the sheet material may be close woven fiberglass which may form an exposed exterior skin of considerable durability and toughness. In the drawings no showing has been made of the supply material for the exterior of the roofing, if such is desired, however, supports for the same could be furnished by any skilled mechanic. For the sake of clairty, a supply of lining material has been illustrated in FIG. 1 for only one side of the building. Exterior side form members 9 roof form members 10 and inside form members 11 are also suitably mounted on the support members. These form members need not be of any great width and accordingly project from the support members only a sufficient distance to allow the material which is cast thereon or therebetween to set and rigidify before forward progress of the machine causes removal of said forms. In fact, the so called form members may be regarded as little more than a travelling surface upon which the foam material is deposited. The slow forward progress of supporting framework also produces a slight trowling action until the cast material solidifies and sets. The form members are generally merely relatively thin, flat sheets of metal or plywood, etc. Various sizes and shapes of buildings may be produced by either varying the dimensions of the sheets used as form members or by telescoping two or more sheets one upon the other and providing a means for adjusting same to the desired dimensions. The vertical support members consist of two or more elements (4a and 4b) telescopically mounted one within the other to allow for adjustment as shown in FIG. 1a. By adjusting the support members on one side relative to the other, the pitch of the roof or ceiling members may also be adjusted or varied at will. In like manner, the horizontal brace members for such support members may be also telescopically mounted to provide for adjustment of the width of the building as shown at 5a and 5b in FIG. 1. To accommodate any great adjustment in the building width, it also may be desirable to either provide similar telescopic adjustment for the horizontal members of the base frame or to mount the support members movably on the base frame to allow for added horizontal adjustment.

Supply means, for whatever formable material is used to produce the building, generally designated by the numeral 12, are provided between all pairs of form members. In the case of substantially horizontal forms such as the roof or the ceiling, where it may not be necessary to provide a pair of forms, the supply means are merely placed conveniently above said forms. When the material used to form the structure is polyurethane foam, the supply means obviously consists of conduits to bring the liquid ingredients to the point of application where they are mixed in suitable spray nozzles designated as 13 which spray the foam onto the forms or into the space there between. As is understood in the art, materials such as polyurethane foam set substantially simultaneously with the mixing and the continuous supply of ingredients to the spray nozzle results in the building of a deposit of rigid foam material in the space between the forms. As the machine progresses, additional material supplied to the face of the forms obviously becomes incorporated into the previously applied setting foam to become an integral part of the foam just previously applied. So long as the foam material is continuously supplied and the machine with its forms is moved slowly forward, a continuous integral building will be produced. While my machine is essentially designed for and directed to the forming of buildings of polyurethane foam, it is obvious that other materials such as plastic material that may be whipped into a foam before being conveyed to the point of deposition can be used as desired. Also, other materials which might require heat to produce a reaction or setting thereof can be used but will require forms provided with some heating means. In either of these latter cases, the supply means would be suitably chosen to handle the materials involved; in the case of a pre-formed foam a similar conduit with a single discharge nozzle might be used and where heat was required to produce a setting action suitable heating elements such as steam pipes would have to be attached to the exterior surfaces of the form members.

It is also obvious that my machine may use cementitious material such as conventional "gunite". In such instances, heavier and wider form members would be required to support the weight of the cementitious material while setting.

When it is desired to apply the material manually a substantial horizontal platform is mounted on the supporting elements so workmen may stand thereon to manually deposit the material upon the horizontal surfaces as the machine advances. When manually applying the material to the space defined by the side wall forms it is obvious that the supply means for any facing material, supplied either to the exterior or the interior of the walls, must be offset sufficiently from the side wall forms to allow the workmen to stand between the said supplies of facing materials. In such instances a guide roll 21 (see FIG. 3) may be placed at the leading edge of the forms to aid in the feeding of the lining material thereto.

Figure 4:
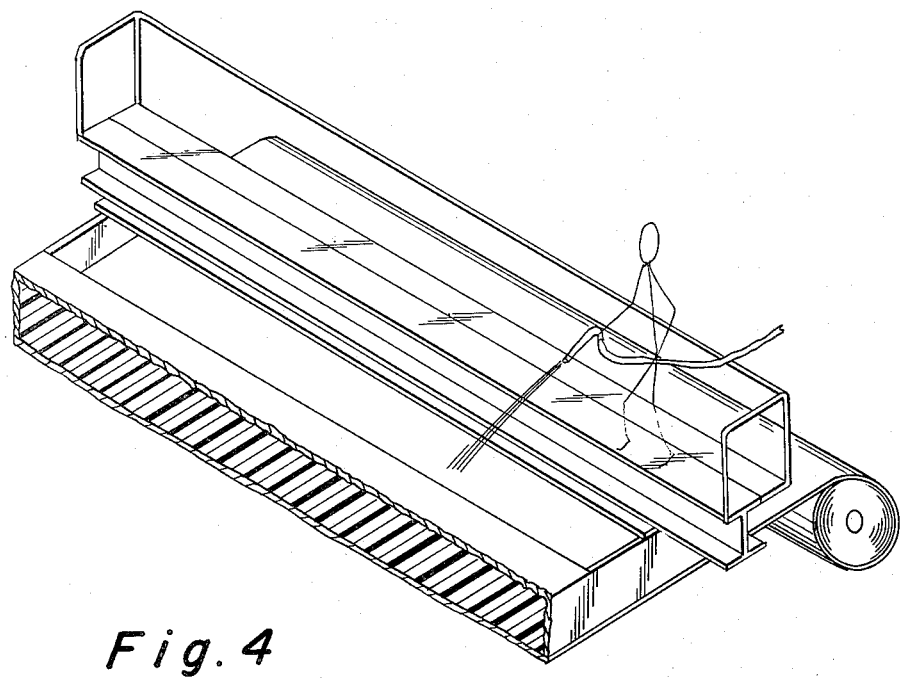
FIG. 4 is a perspective view showing the provision of means to allow manual deposition of material to the roof portion of the building.
Figure 5:
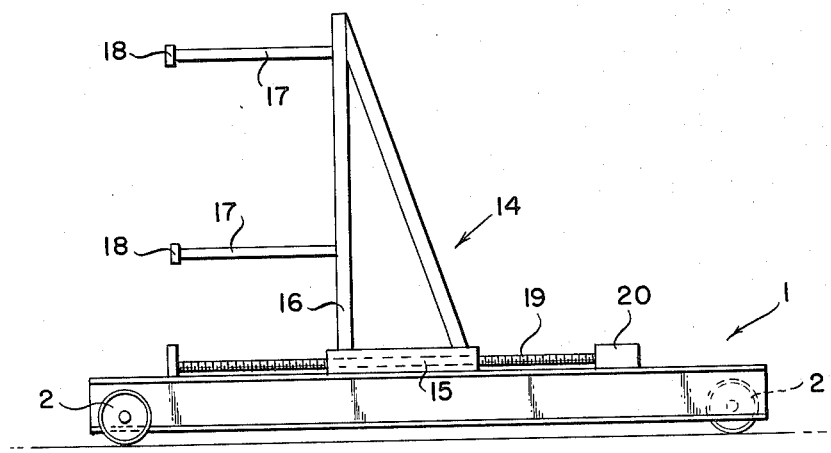
FIG. 5 shows a detail of the means provided to support and position various building adjuncts such as windows, doors, sprinkler systems in place during the formation of the building.

When it is desired to incorporate building adjuncts such as doors and windows, etc., into the wall of the building, positioning elements 14 (see FIG. 5) may be used. Such positioning elements consist of a base 15 which is mounted on the longitudinal elements of frame 1 for movement there along. On said base 15 are suitable upright elements 16 with extending arms 17 having suitable clamping elements 18 at the end thereof. For positioning such elements as windows and doors the positioning element is placed on the frame at its forwardmost position with the ends of its positioning arms extending toward or even into the molding area with the door or window frame clamped thereto. As the wall of the building structure is built up, the positioning means is moved rearwardly along the frame at a speed equal to the forward motion of the frame, thus holding the adjuncts to be positioned stationary between the two forwardly moving forms. The positioning means may be moved along the frame by any conventional apparatus as for example a screw threaded rod 19 actuated by motor 20 and synchronized with the motor means which is used to produce forward motion of the frame. Also, it is not necessary to provide a positive means for moving the positioning means along the face of the frame members since some suitable clamp could be provided to temporarily attach the same to the ground. In which case, forward motion of the frame would cause the positioning means to slide rearwardly along the top face thereof. Any number of extending arms or clamps may be provided as desired. When the element to be positioned in the building is of any significant size such as windows or door frames, it is obvious that the spray nozzles which would normally supply materials to the space occupied by said insert will be disconnected or closed until the deposition of the material for the remainder of the building has progressed to a point coincident with the forward edge of said frames.

When the adjuncts to be incorporated in the building are continuous such as air ducts, plumbing, electrical conduits, sprinklers, etc., the positioning arms may be provided with a clamping mean which also functions as a guide member. As such adjuncts become embedded in the building they slide through the clamping elements as the forms move forward and as they are continuously incorporated into the building. In such instances the positioning elements may move continuously with the machine.

Figure 6:
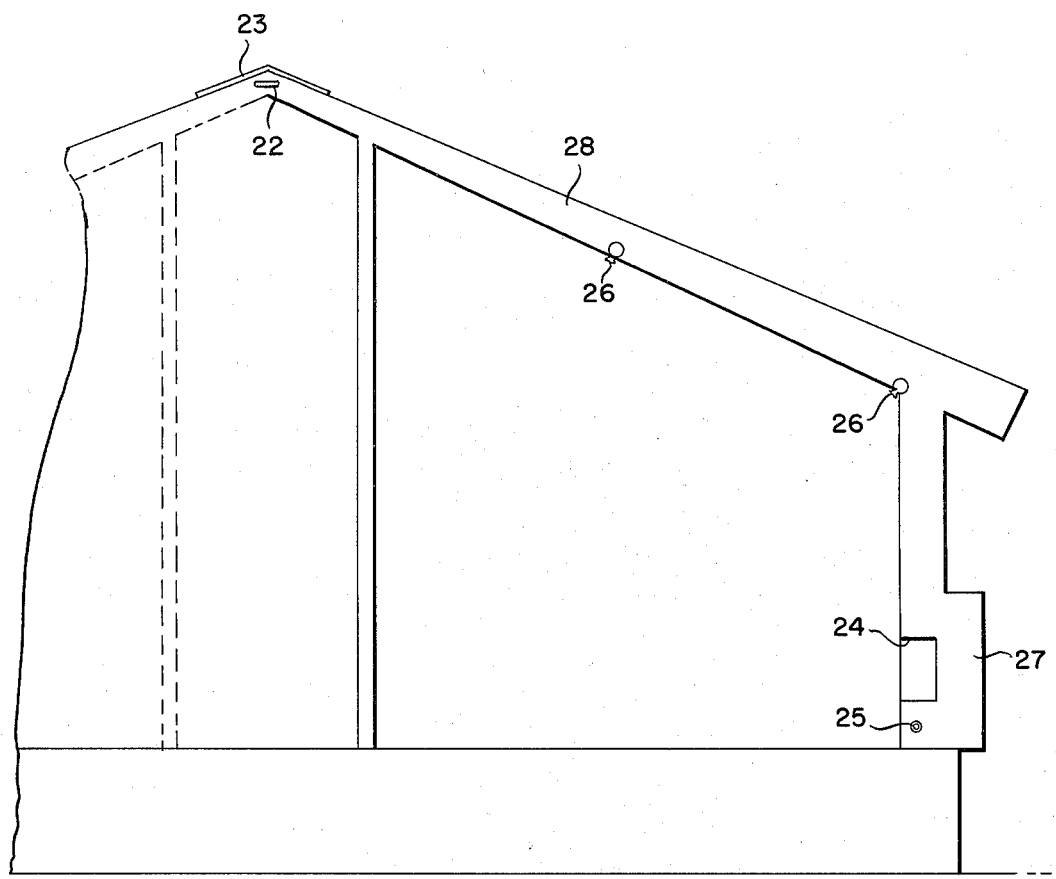
FIG. 6 is a diagramatic view showing some changes of dimensions of the building members such as walls and roofing which are possible in accordance with this invention and also showing adjuncts incorporated therein.

In instances where buildings of the type outlined in FIG. 6 are to be produced and it is possible to use a frame of sufficient size to cover the entire building area, it is necessary to also provide intermediate form members positioning to produce the interior longitudinal walls of the building. Temporary wall forms may be required to produce lateral walls. These temporary forms obviously will be positioned by use of the positioning elements 14. The form members at the edges of the frame thus will each produce exterior building walls. Where the width of the building is such as to make the use of a frame member of the required size impractical, the building may be constructed in two halves by using the machine to first form one half of the building and then reversing the same to form the other half. The machine may be completely reversed to produce the second half as a mirror image of the first half. Obviously under such conditions only the half of the building produced by each pass of the machine will be a homogeneous structure and a joint will be present between the attached halves. In this instance, tie members which may be conventional reinforcing rods or other suitable means are provided as illustrated by numeral 22. Also the exterior or exposed portions of the joint between the two building halves may be suitably provided with overlying covering material so as to render the said joint both waterproof and structurally sound. Such additional overlapping material at the joint is illustrated in FIG. 6 by the reference numeral 23.

In the production of buildings requiring more than one pass of the machine it is not necessary that the second half be a mirror image of the first half of the building as obviously the forms may be adjusted to produce different dimensions or shapes in the second half so formed. In the case of buildings with large areas such as factories, etc., more than two passes of the machine might be required. In such instance only the first and last pass of the machine would produce exterior building walls.

Should it be desirable to produce a building structure without any interior walls obviously the forms used for the roof would extend from one side wall of the building to the other and could be designed to produce any shape of roof desired as illustrated in FIGS. 7, 8 and 9.

My machine is subject to a great number of obvious modifications all of which may be incorporated and embraced in the main body of the machine as above outlined without departing from the basic principals of the machine. It is obvious that the machine may be used to produce air conditioned and fireproof buildings as it is possible to incorporate the duct work 24 for air conditioning and heating in the body of the building simultaneously with the progress of the machine. Also plumbing, electrical conduits 25 and sprinkler elements 26 to fireproof the building, etc., may be incorporated within the body of the building as the same is produced. The number of positioning arms and the type of clamping elements used on the positioning means would, of course, vary with the specific elements to be incorporated into the building.

The incorporation of a sprinkler system in the building as an integral part thereof is one of the outstanding advantages of my invention. The positioning element may be provided with a special extending arm to position the sprinkler nozzles near the instersection of the side walls and ceiling or roof with the required sprinkler nozzles practically flush with the walls or the roof; in so doing the positioning element may move with the machine allowing the conduit element to slide along the guide or clamp and then be halted for a period and hold the nozzle stationary while it was incorporated in the building; then said positioning element would be advanced along the frame of the machine to its original position. If it is desired to place the sprinkling nozzles in the roof or ceiling a beam element may be provided extending from the upright elements on one of the positioning elements on one side of the frame to the upright on the corresponding positioning elements on the opposite side of the frame with additional extension arms mounted thereon.

As also shown in FIG. 6 the walls or roof of the building do not have to be uniform in thickness. Stepped or offset forms may be used to form a wall with a thicker base portion 27 or a wall having a tapered thickness as shown in the roof 28 of FIG. 6, may be made by merely proper adjustment of the forms.

While the above description has been devoted to a machine for forming a building on a pre-formed slab or foundation element, it is obvious that lower form members may be provided on the frame of the machine to also form a floor of a building as well as the roof thus producing a completely homogeneous integral building. In instances where it might be desirable to form a building with a conventional crawlway or space beneath the same pre-formed foundations or columns could be provided to support said building. Obviously under such conditions elevated trackways would necessarily be provided so that the floor fo the building could be cast or formed directly upon the pre-positioned support means. It is equally obvious that where an elevated track is provided for my machine that masonry pillars or supports may be manually built underneath the formed building structure, to support the same, as the formation of the building proceeds.

The operation of my machine has been described for the production of the longitudinal walls and roofing and floors of a building and where a truly homogeneous building is desired suitable end forms may be temporarily positioned entirely across the rearward end of the machine and the building material manually applied to these forms to produce the said building end. Upon the completion of the end the forward movement of the machine may be commenced to form the longitudinal walls. At the opposite end of the building temporarily formed structures may be again supplied so that the deposition of the building can be continued manually at that end.

I claim:

1. A machine for continuously producing homogeneous building structures from formable materials including frame member means to continuously move said frame member over the area to be occupied by said building while formable material is being fed thereto, support elements on said frame member, vertical form members attached to said supports, horizontal form members attached to said supports, supply means positioned adjacent to said form members for supplying formable material thereto, positioning means movably mounted on the foremost portions of said frame member, with arms extending therefrom into the area defined by said form members, means on said arms to hold, in their proper position, elements desired to be incorporated into said building.

2. The invention of claim 1 including means carried by said support elements adjacent to said form members for supplying lining material to the faces of said form members.

3. The invention of claim 2 wherein platforms for the support of workmen are provided adjacent to forward end of said form members.

4. The invention of claim 3 wherein the means for supplying lining material to said form members are offset from the form members adjacent to said platform means.

5. The invention of claim 4 wherein the support elements and frame members are adjustable to accommodate different sizes and shapes of form members.

6. The invention of claim 5 wherein the form members are also adjustable.

7. The invention of claim 6 wherein means is provided to move the positioning means relative to movement of said frame member.

8. The invention of claim 7 wherein the means which moves the positioning means is designed to move said positioning means at the same speed as the frame member but in a direction opposite to said movement.

* * * * *